April 23, 1963 O. A. JORGENSEN 3,087,096

WAFER PARAMETRON

Filed Jan. 18, 1960 3 Sheets-Sheet 1

INVENTOR
OTTO A. JORGENSEN

BY F. H. Henson

ATTORNEY

INVENTOR
OTTO A. JORGENSEN
BY
F. H. Henson
ATTORNEY

April 23, 1963 O. A. JORGENSEN 3,087,096
WAFER PARAMETRON
Filed Jan. 18, 1960 3 Sheets-Sheet 3
FIG. 7
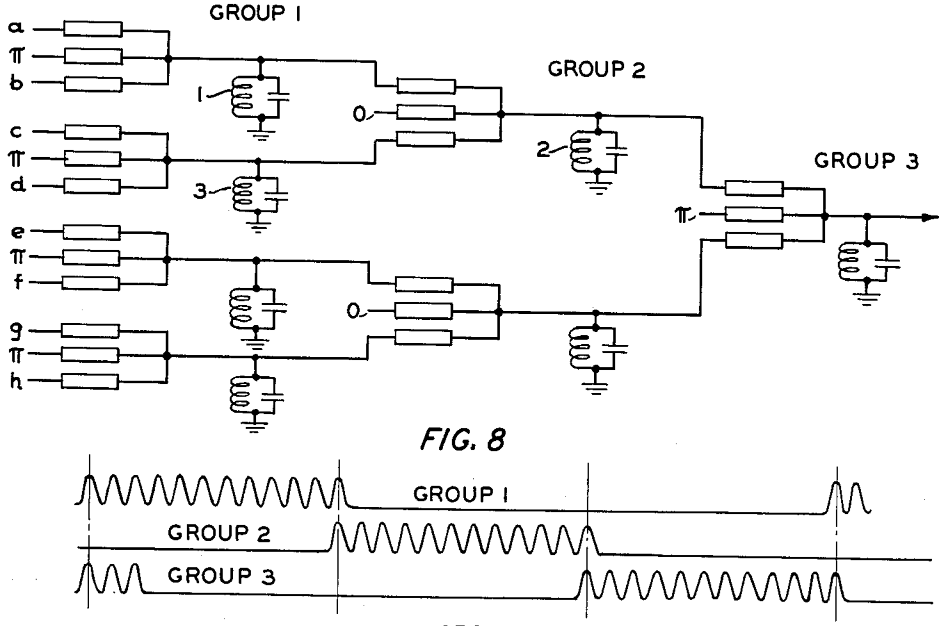
FIG. 7, FIG. 8
FIG. 9
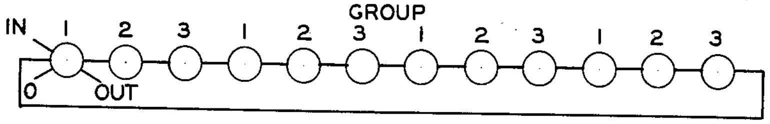
FIG. 10
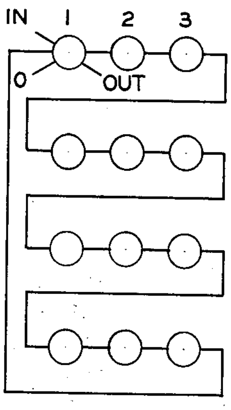
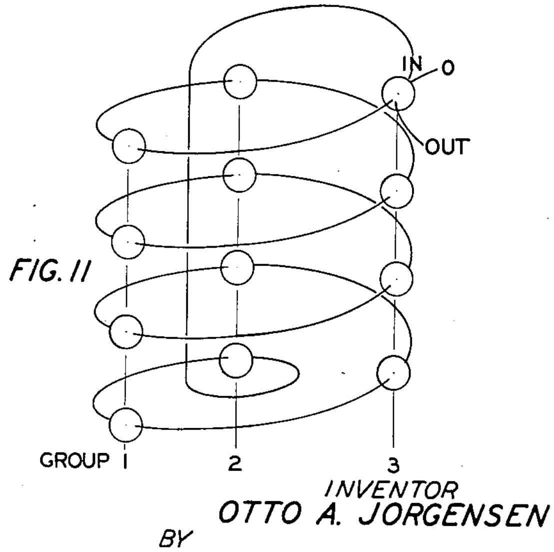
FIG. 11
INVENTOR
OTTO A. JORGENSEN
BY
F. H. Henson
ATTORNEY United States Patent Office
3,087,096
Patented Apr. 23, 1963

3,087,096

WAFER PARAMETRON

Otto A. Jorgensen, Pittsford, N.Y., assignor to General Dynamics Corporation, Rochester, N.Y., a corporation of Delaware Filed Jan. 18, 1960, Ser. No. 3,125
4 Claims. (Cl. 317—101)

This invention relates to electronic circuit components and particularly to modular means generally known as logic devices such as those employed in digital computers to transmit, amplify, store, count, and otherwise handle information in the form of electrical signals representing binary digits.

The object of the invention is to provide circuit components in the form of minor modules in which the elements of construction participate in the electrical circuit response and which may be assembled in groups to form a major module in the fabrication of a complex device, such as a digital computer. The minor module and the additional construction elements used therewith to form the major module have many of the aspects of the so-called printed circuit and, in addition thereto, possess certain properties which enter into and form a part of the electrical circuit response.

In general, each minor module comprises a parametron and consists of a tank circuit tuned to a given frequency and is controlled by a variable parameter reactor. Each such parametron consists of a thin wafer of dielectric material for supporting the printed circuit and also supports a ferrite core recessed in a suitable perforation and having its windings appropriately interconnected with the traces of said printed circuit. The dielectric wafer, by way of example, may be formed of barium titanate having a linear capacitance reaction and the ferrite cores may have the nonlinear square loop hysteresis characteristics commonly present in such cores when used as memory organs.

As an aid to understanding the construction and use of the parametron, reference is made to the following examples of the prior art.

(1) Patent 2,815,488, John von Neumann.
(2) An article entitled "A New Concept in Computing" by R. L. Wigington, published in the Proceedings of the Institute of Radio Engineers for April 1959, pages 516–523.
(3) An article entitled "The Parametron, a Digital Computing Element Which Utilizes Parametric Oscillation" by Eiichi Goto, published in the Proceedings of the Institute of Radio Engineers for August 1959, pages 1304 to 1316.

A feature of the invention is the construction of parametrons in a triangular array of three. Such a construction is particularly applicable to parametron circuitry where these devices are arranged in groups of three to carry out the logic according to the majority principle. In accordance with this feature, a triangular wafer of dielectric material bearing three parametrons is fabricated as a triad of minor modules and the inputs and outputs of the three parametrons are so arranged in this triangular base that the cascaded circuit extends substantially in a circular direction thereabout. With such an arrangement, a plurality of such triads of minor modules may be stacked into a triangular column so interconnected with the shortest possible links that the total cascaded circuit assumes a substantially spiral configuration and becomes a major plug in module, for use as a counter, a delay line, or other conventional component of a digital computer.

A feature of the invention is the fabrication of a plurality of minor modules into a major module of a shape and physical configuration particularly appropriate to the circuitry employed in the working of parametrons, thereby providing a compact unit not only considered from the standpoint of space but only considered from the standpoint of simplicity, orderliness and efficiency of the circuit arrangement.

Another feature of the invention is the fabrication of a plurality of parametrons in a three dimensional array whereby symmetrical wiring between parametrons may be achieved.

Another feature of the invention is the fabrication of an electronic component for plug-in connection in a circuit network in a manner allowing for adjustment of circuit constants by physical alteration of the device. The triad of minor modules of the present invention is a set of three parametrons each of which is essentially a tuned tank circuit, the condenser thereof being formed by enlarged areas of circuit printing on the two opposed sides of the base wafer of dielectric material. In accordance with this feature, the tank condenser is fabricated about the triangular tip of the wafer whereby the capacity of the condenser may be reduced somewhat by snipping off the tip of the element. Thus, by a physical alteration of the plate area of the condenser, the tank may be finely adjusted to resonance at a particular frequency.

Another feature of the invention resides in the formation of condensers by the deposit of printed wiring material on the opposed sides of a thin wafer of dielectric material whereby a circuit arrangement including a plurality of condensers all having a common plate may be formed. By way of example, in one form of parametron, the tank tuning condenser is connected to three separate output capacitors and hence one of the plates of this tuning condenser may also be used as one of the plates of each of the said coupling condensers.

Other features will appear hereinafter.

The drawings consist of three sheets having twelve figures, as follows:

FIG. 7 is a schematic circuit diagram showing the grouping of a plurality of parametrons each having three inputs whereby logic based on the majority principle may be performed;

FIG. 8 is a set of graphs showing how the excitation supply power for the three groups of parametrons is related in time;

FIG. 9 is a schematic circuit diagram showing how a set of twelve parametrons may be cascaded in a series circuit;

FIG. 10 is a schematic circuit diagram with the parametrons of FIG. 9 rearranged in groups;

FIG. 11 is a schematic circuit diagram showing the parametrons of FIGS. 9 and 10 placed in a three dimensional array in accordance with the present invention whereby a completely symmetrical circuit arrangement is achieved.

Figures 1, 12:
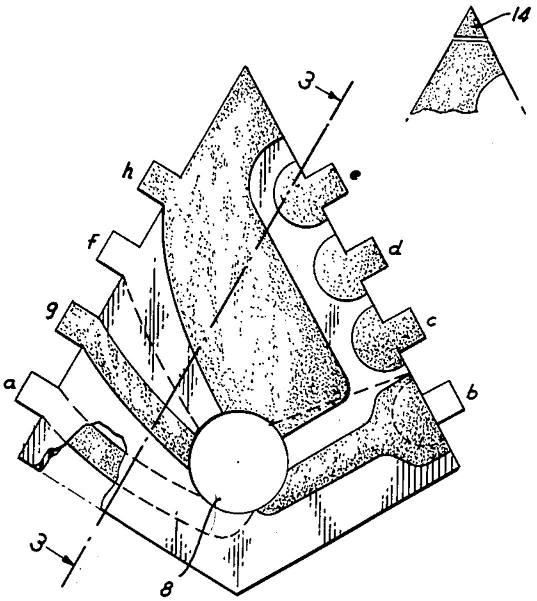
FIG. 1 is a plan view of one parametron forming a minor module and having a small portion of the base dielectric broken away in order to show the conductor of the printed circuit on the back surface thereof.
FIG. 12 is a fragmentary plan view of the triangular tip of a single parametron showing how the tank condenser may be adjusted by physically trimming off the tip thereof.

As a short explanation of the operation of the parametron and to make the reason for the use of these devices in groups of three and therefor the triangular aspect of the complete device clear, the following remarks are offered.

The parametron has a passive and an active period. In the passive period it has no excitation and acts as a passive linear network. The input signals are received in this period.

The logic is based on a majority principle such that logic decisions are made according to the condition of the majority of the signals. For that reason a parametron must have an odd number of inputs, so that a condition of no majority cannot occur. Two stable states, denoting 0 and 1 may be signalled by the parametric oscillation of 0 or $\pi$ phase which are equal and opposite ($\pi$ radians corresponds to 180°) and, since these may be added, the sum will always be either 0 or $\pi$ phase. The resultant wave, to be useful for further manipulations, must be amplified and standardized. This amplification and standardization is done in the succeeding period which is known as the active period.

The active period is characterized by the fact that amplification is produced by application of parametric excitation. The excitation is applied to a winding which has no mutual inductance with the tank winding but acts only to produce inductance variation and consequent parametric amplification.

The amplification takes place in the first part of the period when whatever signal is present initially is amplified, still maintaining its phase (the parametron has memory). The amplification is gradual so that one may speak about an amplification per cycle or a db/sec. Once sufficient amplitude has been reached, the second part of the active period takes place during which the wave is standardized by the limiting action controlled by the saturation of the magnetic material. The signal is then transmitted in this limiting period as a standardized signal of one phase or the opposite (0 or $\pi$). After the parametron has performed its mission it may revert to the passive period and await a new combination of input signals. It may be said that parametron recovers in its passive period because the resonant signal has to die down below a certain level before the device is useful again.

The input signals to a logic machine are normally combined in a sequential and simultaneous manner and they are logically acted upon in several processes occurring sequentially in time. In transistor-diode logic and other types of logic the sequential nature is sometimes overlooked but it is its presence that makes possible the functioning of flip-flops and other similar devices. With parametrons a standard delay equalling the active period is introduced for each sequential operation. This is inherent in the behavior of the parametron and is synonymous with the separation in time between input and output.

The following example of a logic circuit can be used as an illustration of this delay and it will also serve to explain the method of sequential excitation. In FIG. 7 there are shown a plurality of eight input circuits denoted $a$ to $h$ inclusive leading into a logic network where it is arranged to first perform four OR functions, then two AND functions and finally one OR function. Let it be assumed that the inputs are of a standard amplitude and that the coupling networks have the same impedance. In this circuit each parametron has three inputs, two variables which can be either 0 or $\pi$ phase and a fixed input $\pi$ for OR functions and 0 for AND functions.

While this example is simple and while it will be realized that in other circuits the parametrons may have several inputs and several outputs, the physical location of these elements may be the same and the changes in circuit configuration would be restricted to wiring changes only.

Looking at FIG. 7, it will be noted that the parametron 1 has three inputs, $a$, $b$ and $\pi$ and this constitutes an OR input since with either $a$ "or" $b$ passing a $\pi$ signal, the parametron 1 will be excited for a $\pi$ signal. In like manner, the three inputs to parametron 2 constitute an AND circuit since, having one permanent 0 input, both the input from parametron 1 "and" the input from parametron 3 must be $\pi$ signals to cause parametron 2 to be excited for a $\pi$ signal. The OR functions are performed while the group 1 parametrons are in the passive periods, so that small signals of phases corresponding to the combinations of input conditions will appear across each parametron in the first group. By way of example, if the $a$ and $b$ inputs are both 0 phase, then the majority of the three inputs to parametron 1 will be 0 phase and the tank circuit will resonate at this 0 phase for a period long enough so that a remnant thereof will be present when the parametron is excited. These parametrons will now be subjected to excitation so that they will enter the active period with the appropriate signal phase already applied to them. The signal will therefore be amplified and next shaped or standardized in amplitude so that the two AND operations can be produced. The result of the AND function will appear across the group two parametrons still in the passive period, but they will now be switched to the active period by group two excitation. The first group can now go back to passive operation for recovery and subsequent susceptibility for a new input.

Once the AND signals (group 2) are sufficiently amplified and shaped, the process is repeated for group three and at the output will finally appear the result $$(a+b)(c+d)+(c+f)(g+h)$$

in the form of a standardized signal of one phase or the opposite.

The excitation of the parametrons is carried out by applying a high frequency current to the variable parameter reactor (commonly of double the frequency of the signal and to which the parametron is tuned). It has been found that a passive period sufficiently long for the parametron to recover is less than two times the active period. Therefore, the excitation process can be made cyclic and instead of introducing a fourth excitation source for the parametrons in a fourth group (where more than three groups are required for the logic), the excitation windings in such fourth group may be supplied by group one excitation. The next group becomes group two and so forth whereby the conventional three-step excitation system is provided.

Additionally, it should be noted that the attenuation to a particular parametron in its susceptible state from the nearest higher active parametron is much higher than that from the nearest lower active group. Therefore the parametron in question will be controlled from the nearest lower group, which is the one immediately preceding it.

Thus, a power source is needed which can supply three groups individually with high frequency power in a three-step sequence as shown in FIG. 8.

The parametrons for each group are normally fed in series. The power source, also, has an output lead (not shown) for the supply of continuous reference voltage of a frequency one-half of the excitation frequency and synchronized to it.

The parametrons can be coupled together with either resistors, inductors, capacitors, transformers, or combinations of these. Capacitive coupling having certain advantages electrically and mechanically is herein disclosed. One of the important features of the present invention is that the coupling capacitors can physically be made part of the tuning capacitor, one side of the tuning capacitor being common with one side of the coupling capacitor. It has been found, by way of example, that a useful range of coupling capacitance is from five to six and a half percent of the tuning capacitance.

The signal can be inverted by an extra winding on the parametron core wound in opposition to the regular tank winding and this inverter winding is then coupled capacitively like the normal signal. The coupling capacitor can then be deposited on the same ceramic plate as the regular coupling capacitors and the tuning capacitor. With such an arrangement a self-contained logic element is provided having all parts necessary for the performance of different kinds of logical functions.

The above described characteristics lead to a new modular concept which may be disclosed by the following schematic illustration of a dynamic storage unit which may be termed a circulating store. The dynamic storage unit can store a number of binary bits in the manner of a delay line with feedback. FIG. 9 shows a possible electrical connection where the parametrons shown conventionally as circles with inputs entering at the left and outputs emerging from the right are shown in a cascaded circuit, the coupling impedances and excitation connections being omitted, but the groups to which the various parametrons belong being indicated above these devices.

This circuit may now be redrawn as FIG. 10, with the parametrons in the individual groups shown vertically in relation to each other. The parametrons can here be imagined to exist in a plane. Wiring between them would necessarily be unsymmetrical in that the connections between group three and group one parametrons would be longer than other connections. However, it may be imagined that the schematic is wrapped around a cylinder whereby a new representation in three dimensions as indicated in FIG. 11 is produced. Here each column represents a group of parametrons and the excitation can be supplied through vertical wires feeding the units in series. This arrangement is perfectly symmetrical in agreement with the strictly democratic nature of the parametrons, leaving equally high significance for all parametrons regardless of group and position.

In order to fabricate a major module for producing the above described arrangement, a triangular construction has several advantages. The triangles are formed by three kite-shaped parametrons (shown in FIG. 1) built together. Each corner should belong to one excitation group, and an arbitrary number of triangles could be stacked one on top of the other.

Figure 2:
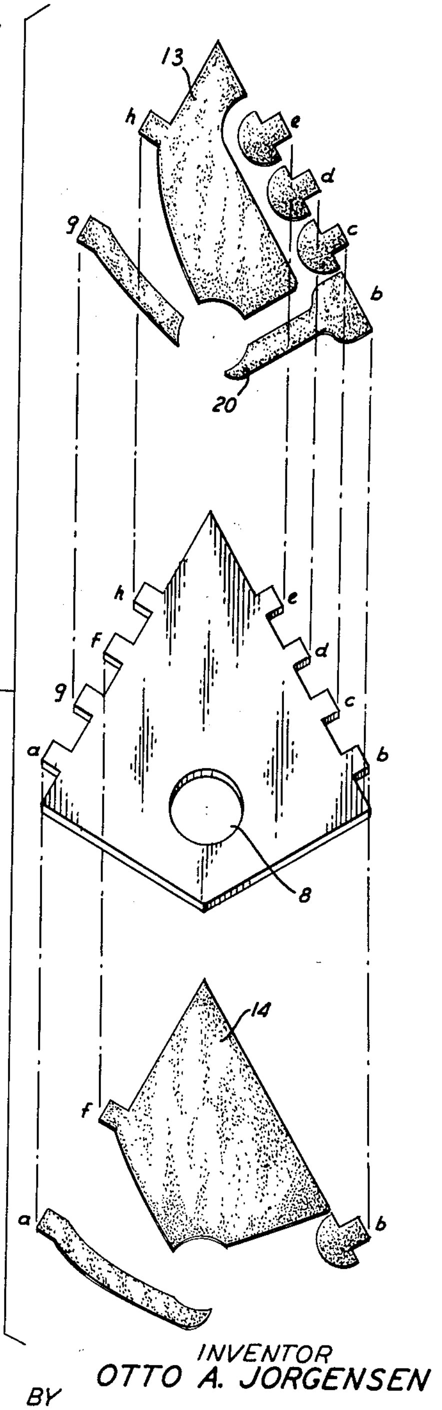
FIG. 2 is an exploded view of a parametron showing at the top the conductive printing on the front side seen from the front side of the wafer, at the middle, the dielectric wafer on which the printed circuitry is fixed, and at the bottom, the conductive printing on the back side of the wafer seen from the front side thereof.
Figure 3:
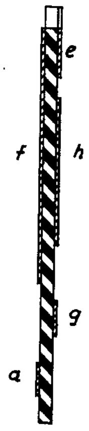
FIG. 3 is a cross sectional view taken along the line 3—3 of FIG. 1.
Figure 4:
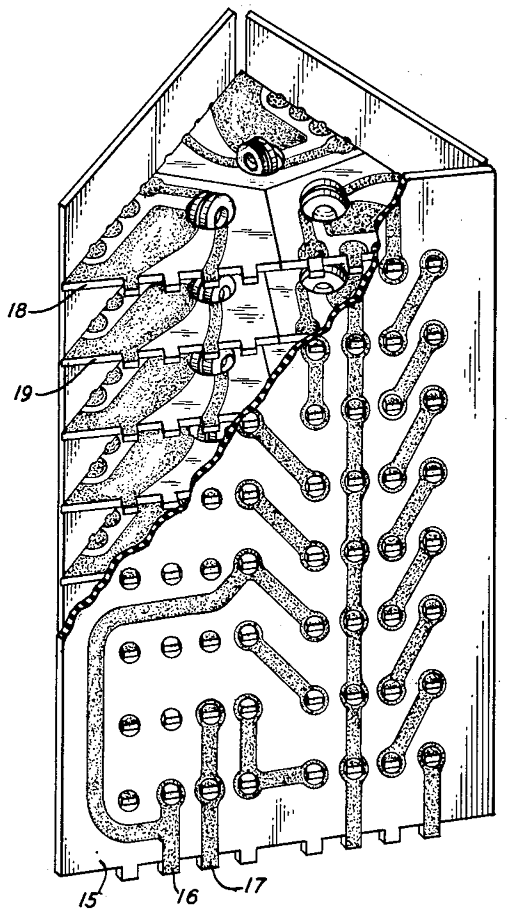
FIG. 4 is a perspective view of a major module with one of the side plates broken away to show how a plurality of minor modules may be stacked into a triangular column and interconnected by printed circuitry on the face of the side plates.

FIG. 1 is a front view of one of the three parametrons (greatly enlarged in its dimensions) forming a part of a minor module. FIG. 2 is an exploded view of the same and each shows the four input tabs, *a*, *g*, *f* and *h*, and the four output tabs, *b*, *c*, *d* and *e* (it should be noted that the interconnections of the various minor modules indicated in FIG. 4 is fanciful and is only intended to indicate that the minor modules may be interconnected by printed circuitry on the three supporting plates).

Figure 5:
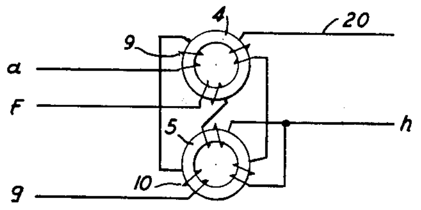
FIG. 5 is a schematic circuit diagram showing the two cores which constitute the variable parameter reactor and the wire ends of the coils thereof for interconnection to the printed circuitry, the letters *a*, *b*, etc. being the same as in FIGS. 1 and 2.
Figure 6:
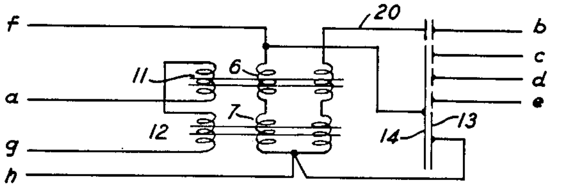
FIG. 6 is a schematic circuit diagram, substantially a duplicate of FIG. 5, but expressed in another manner and showing the complete circuit of a parametron and intended to make the arrangement of the condensers of the parametron clear.

The inductors (4 and 5 of FIG. 5, and 6 and 7 of FIG. 6) are suspended or mounted within the hole 8 of FIGS. 1 and 2 with the circuit connections soldered to the circuit traces of the printed pattern as indicated in FIG. 5. By way of example, the excitation windings 9 and 10 of FIG. 5 and 11 and 12 of FIG. 6 are connected to the input tabs *a* and *g* and the input to the parametron is connected to tab *f*, the tab *h* being the ground for both input and output. The output 20 and the tab *f* form condenser plate connections for the output tabs *b*, *c*, *d* and *e*.

An eventual fine adjustment of the capacitance of the principal or tank condenser formed by the extended circuitry areas 13 and 14 can be made by cutting off the tip 14 of the wafer as indicated in FIG. 12. The advantage of this kite shaped construction is that the output connections are on one edge and the inputs are on the other, whereby on each side of the triangular build up all connections can be made on a connector plate which is particular to that side.

It is to be noted that the connector plates, such as the plate 15, are also used for mechanical support of the various minor modules 18, 19 and so on, and that they can be supplied with connector terminals 16, 17 and so on for plug-in to larger circuits.

The construction indicated in FIG. 4 would be termed a major module and could, by change of printed circuitry only, perform varied operations as counting, storage, gating, coding and other conventional computer operations.

What is claimed is:

1. An array of storage devices comprising, (*a*) a first and Nth tier of storage devices, where N is an integer greater than one, each tier including a first, second, and Mth storage device, where M is an integer greater than two, each of said storage devices in turn having an input circuit, an output circuit, and an enabling circuit, (*b*) means for coupling the output circuit of the first storage device in said first tier to the input circuit of the second storage device in said first tier, (*c*) means for coupling the output circuit of said second storage device in said first tier to the input circuit of the Mth storage device in said first tier, (*d*) means for coupling the output circuit of said Mth storage device in said first tier to the input circuit of a first storage device in said Nth tier, (*e*) means for coupling the output circuit of said first storage device in said Nth tier to the input circuit of a second storage device in said Nth tier, (*f*) means for coupling the output circuit of said second storage device in said Nth tier to the input circuit of an Mth storage device in said Nth tier, (*g*) means for applying a first enabling signal to the enabling circuit of the first storage device in each tier, (*h*) means for applying a second enabling signal to the enabling circuit of the second storage device in each tier, and (*i*) means for applying a third enabling signal to the enabling circuit of the Mth storage device in each tier.

2. The combination as set forth in claim 1 wherein said storage devices constitute parametrons.

3. The combination as set forth in claim 2 wherein said first, second and third enabling signals are out of phase with one another.

4. The combination as set forth in claim 1 wherein said first, second and third enabling signals are out of phase with one another.

References Cited in the file of this patent

UNITED STATES PATENTS

| | | |
|---|---|---|
| 2,758,256 | Eisler | Aug. 7, 1956 |
| 2,816,253 | Blitz | Dec. 10, 1957 |
| 2,899,608 | Wellard | Aug. 11, 1959 |